United States Patent [19]

Boggs, Jr.

[11] 4,199,418
[45] Apr. 22, 1980

[54] MERCURY RECOVERY SYSTEM IN ELECTROLYTIC PROCESS

[75] Inventor: Frank Boggs, Jr., Baton Rouge, La.

[73] Assignee: BASF Wyandotte Corporation, Wyandotte, Mich.

[21] Appl. No.: 37,327

[22] Filed: May 8, 1979

[51] Int. Cl.² .......................... C25B 1/16; C25B 1/26; C25B 9/00
[52] U.S. Cl. ........................................ 204/99; 204/250
[58] Field of Search ............................. 204/99, 250

[56] References Cited

U.S. PATENT DOCUMENTS

| 2,748,072 | 5/1956 | Pauloni et al. | 204/99 |
| 2,815,318 | 12/1957 | Shaw et al. | 204/99 |
| 3,607,704 | 9/1971 | Shibata et al. | 204/99 |
| 3,725,530 | 4/1973 | Kawase et al. | 204/99 |
| 3,764,496 | 10/1973 | Hultman et al. | 204/99 |

*Primary Examiner*—R. L. Andrews
*Attorney, Agent, or Firm*—John W. Linkhauer; Joseph D. Michaels

[57] ABSTRACT

A process for making alkali hydroxide and chlorine in a plurality of electrolytic cells of the amalgam type, wherein a decomposer is provided for each cell and wherein alkali metal amalgam formed in the cell is reacted with water in a companion decomposer to form alkali hydroxide, the improvement comprising utilizing for each cell and corresponding decomposer a condenser and a separator component between the condenser and decomposer in the hydrogen outlet line of the decomposer to separate mercury vapor and water vapor initially liquefied in the condenser and divert the condensed mercury back into the decomposer.

8 Claims, 2 Drawing Figures

MERCURY RECOVERY SYSTEM IN ELECTROLYTIC PROCESS

BACKGROUND OF THE INVENTION

1. Field of the Invention

The present invention relates to a process and apparatus for recovering mercury in an amalgam-type electrolytic process, and more particularly in such a process where mercury which is carried out through the hydrogen line in the form of vapor is recycled to the process.

2. Description of the Prior Art

Production of chlorine in alkali hydroxide by the amalgam process is well known, and typically sodium chloride is electrolyzed to produce chlorine and sodium hydroxide. In the first step of the process, brine is fed into one end of this cell along with mercury, and the mercury flows along the bottom of the cell and acts as a cathode. Graphite or more recently developed dimensionally stable anodes are provided so that the electrolysis current flows through the brine solution and forms chlorine gas which bubbles to the top of the cell and is removed typically at the end opposite the brine feed along with the used or lean brine. During the electrolysis, alkali metal such as sodium is formed in the mercury cathode and this forms a mercury amalgam which is also removed from the cell at the end opposite the mercury feed end.

In a separate stage, the mercury amalgam is moved to a decomposer, where it is reacted with water, typically in a countercurrent flow. The decomposer typically contains a graphite packing which provides paths for the flow of electrons. When sodium is the metal in mercury amalgam, sodium atoms leave the amalgam surface as sodium ions into the solution. The electrons left in the metal travel to the graphite surface where the electrons reduce the water to $OH^-$ ions and hydrogen. Mercury amalgam stripped of its sodium is recycled back to the cell. In a typical operation, the caustic and hydrogen are drawn off at the end of the cell where the mercury amalgam is fed in. The water-sodium reaction generates considerable heat, and the caustic and hydrogen removed at their exit end of the decomposer and generally quite hot. Thus, the hydrogen carried with it considerable water vapor and mercury vapor. This mercury vapor, which is swept out with the hydrogen, has been a source of a problem in the amalgam-cell systems for many years.

First of all, the mercury should be recovered to prevent losses of expensive mercury, and secondly, the mercury is poisonous and should not be disposed of into the general environment. Accordingly, considerable effort has been expended in the recovery of this mercury.

In a typical operation, the hydrogen gas from the decomposer is passed through a condenser where water and a major portion of mercury passing out with the hydrogen is collected. The mercury thus collected may be recycled to the cell, and the water rcovered may be recycled to the decomposer. In this way, considerable mercury is retained in the system. Formerly, in multicell units the mercury had to be redistributed to the individual cell according to losses therein. The hydrogen-gas stream passing through the condenser may be then further treated for removing mercury by such processes as that shown in U.S. Pat. No. 3,647,359, or any of the other techniques well known in the art.

Another system is suggested and shown in U.S. Pat. No. 2,588,469 wherein a hydrogen stream is passed downward through a hydrogen cooler, and water and mercury is condensed from the stream and then returned to the bottom end of the decomposer. This system has certain advantages, but it does not provide as efficient condensation as a good conventional condenser operating in its normal vertical pass. In addition, this patent does not disclose multicell production systems.

Another problem has arisen in connection with the conventional mercury-recovery procedures, where a multiplicity of cells and decomposers are utilized, in that the mercury recovered in the conventional condenser must be divided among the various cells and control of mercury distribution is quite difficult. In other words, a typical plant may have perhaps 10 to 50 cells with 10 to 50 companion decomposers, and the hydrogen stream from these decomposers is condensed to provide a rather large amount of mercury. This mercury then must be distributed back to each of the cells in accordance with the losses therefrom. It is this problem along with the general problem of mercury recovery to which the present invention is directed.

SUMMARY OF THE INVENTION

Accordingly, it is the primary object of the present invention to provide a mercury-recovery system which is efficient and absolutely reliable in operation.

Another object of the invention is to provide such a recovery system wherein the major portion of the recovered mercury is properly distributed among the various cell systems whence it came.

These and other objects are accomplished in a process for making alkali hydroxide and chlorine in a plurality of electrolytic cell units of the amalgam type wherein a decomposer is provided for each cell unit and wherein alkali-metal amalgam formed in the companion cell is reacted with water in the decomposer to form alkali hydroxide, in which the improvement comprises the steps of passing hydrogen and the water and mercury vapors carried therewith through an outlet and liquid separator into a condenser, collecting mercury and water condensate from the condenser in the liquid separator, returning the mercury to the decomposer back through the hydrogen outlet, and recycling the water condensate to the decomposer at the normal water-feed location.

In the process, vapors leaving the decomposer are generally at a temperature less than the boiling point of the aqueous alkali-hydroxide solution at its discharge location, and the vapors are cooled in the condenser to a temperature in the range of about 40° F. to about 120° F. The separator is formed with a lower outlet and lower conduit, including a lower trap leading back to the decomposer whereby condensed mercury will automatically flow from the separator through the trap and back to the decomposer, while providing a barrier against water flow through the lower conduit. In this way, it is seen that the mercury vapors condensed in the cooler are automatically returned to the system whence the mercury vapor came. In addition, the cooled mercury vapor will assist in providing a cooled surface for collecting mercury vapor passing in countercurrent flow therewith toward the condenser. The separator is also formed with an upper outlet and upper conduit including an upper trap leading back to the water feed whereby condensed water is recycled to the water-feed line.

The invention also provides an apparatus for making alkali-metal hydroxides from alkali-metal amalgams including a plurality of cells and accompanying decomposers, with each decomposer equipped with a hydrogen outlet, and in which the improvement comprises a separator located in the hydrogen outlet and a condenser located above said separator for condensing water and mercury from the hydrogen stream, said separator being formed for separating the mercury condensate from the water condensate and returning the mercury by gravity to the decomposer through the hydrogen outlet.

DESCRIPTION OF THE DRAWINGS OF APPARATUS

In the accompanying drawings, in which like parts are identified by the same numerals throughout;

FIG. 1 is a diagrammatic view illustrating a portion of a typical apparatus incorporating the invention; and FIG. 2 is an enlarged view, partly in section, illustrating in greater detail the separator utilized in the present invention.

While only the preferred embodiments are shown in the drawings, it should be understood that various changes or modifications may be made therein without departing from the spirit and scope of the appended claims.

DESCRIPTION OF THE PREFERRED EMBODIMENTS

Figure 1:
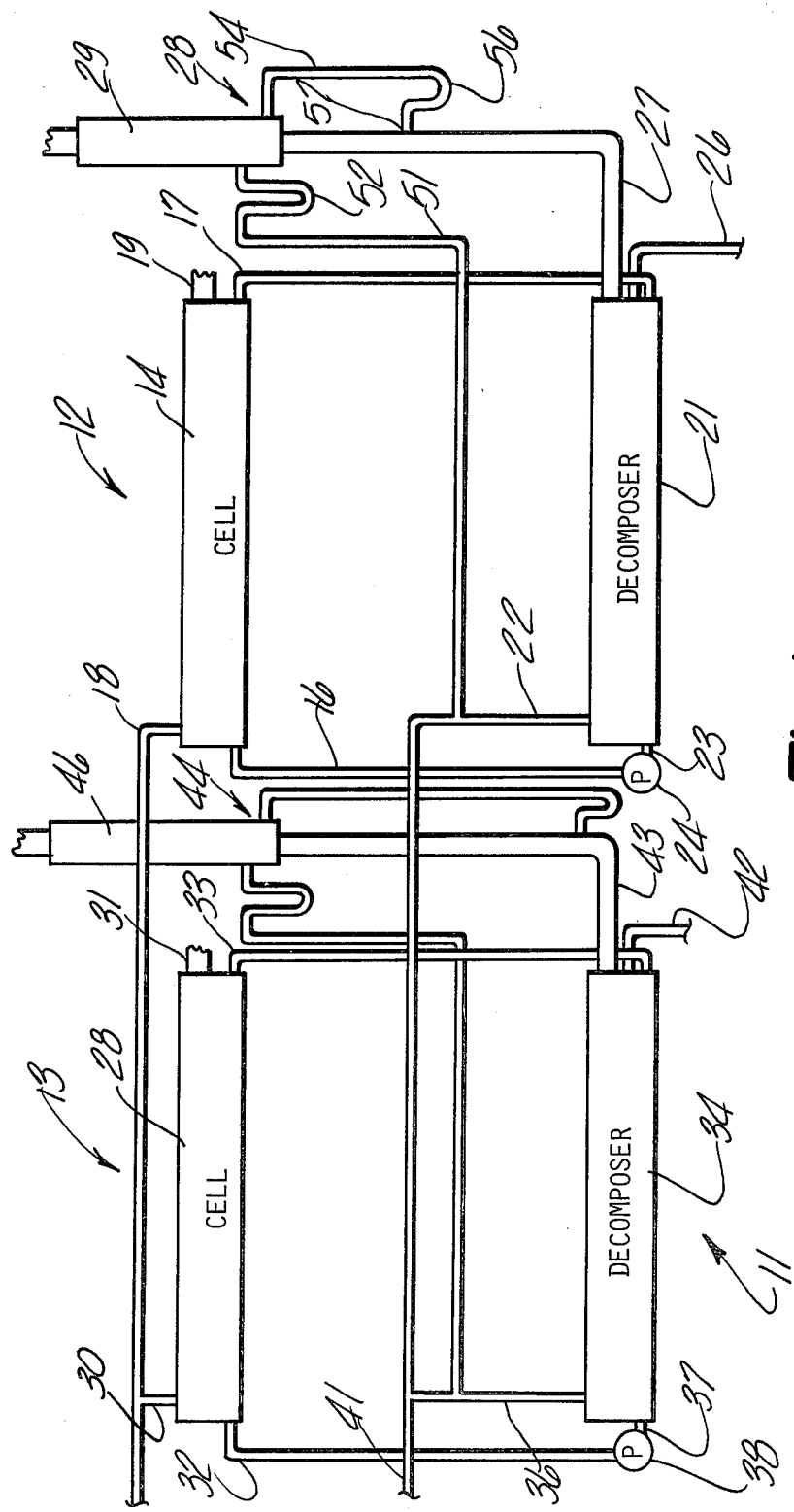

Referring now more particularly to the drawings, there is shown a brine-electrolysis apparatus 11 of the mercury type and comprising a plurality of units 12, 13 and others (not shown). Unit 12 consists of an electrolytic cell 14 containing a mercury cathode (not shown) formed by the flow of mercury through recirculating line 16, with the mercury proceeding slightly uphill to outlet line 17. Brine is fed into the cell through line 18, and spent brine and chlorine are removed from line 19. A complete description of the cell and appropriate valving, electrical controls, and the like are believed to be unnecessary, since the cell is conventional and well known in the art.

Unit 12 also comprises a decomposer 21 which receives amalgam from line 17 at the slightly upper end thereof and feed water from line 22 at the lower end thereof. By the time the sodium amalgam reaches the lower end of the decomposer, it is stripped of sodium, and the mercury exits through line 23 and is pumped through pump 24 back through line 16 to the cell, completing the recirculating loop. The decomposer is also conventional in the art, and a complete description of same is also believed to be unnecessary. In addition, it will be understood that appropriate make-up lines and other structures (not shown) which are typical of this apparatus will also be included, as desired.

Caustic product is formed in the decomposer and is removed through line 26, and hydrogen is also formed in the decomposer and removed through line 27. The hydrogen from line 27 goes through a separator 28 and condenser 29. This separator and condenser is the novel part of the apparatus, and will be described more fully hereinafter in connection with FIG. 2 of the drawing.

Unit 13 is similar to unit 12 and contains a cell 28 having a brine-feed line 30, spent-brine and chlorine outlet 31, mercury-inlet line 32, and amalgam-outlet line 33. Unit 13 also comprises decomposer 34, which receives amalgam from line 33, water from the line 36, and which discharges mercury through line 37 and back to the cell through pump 38 and line 32. Water enters the decomposer through line 36 from main feed line 41, product caustic exits through line 42, and hydrogen exits through line 43. The hydrogen passes through a separator 44 and then through condenser 46. Thus, it is seen that unit 13 and unit 12 are similar in operation and construction and that these units are conventional except for the individual condensers and novel separators incorporated therewith. It will also be appreciated that although two units are shown herein, a typical plant will generally contain many more units and generally in excess of five. A typical plant utilizing the amalgam process has 26 individual cell and decomposer units.

Figure 2:
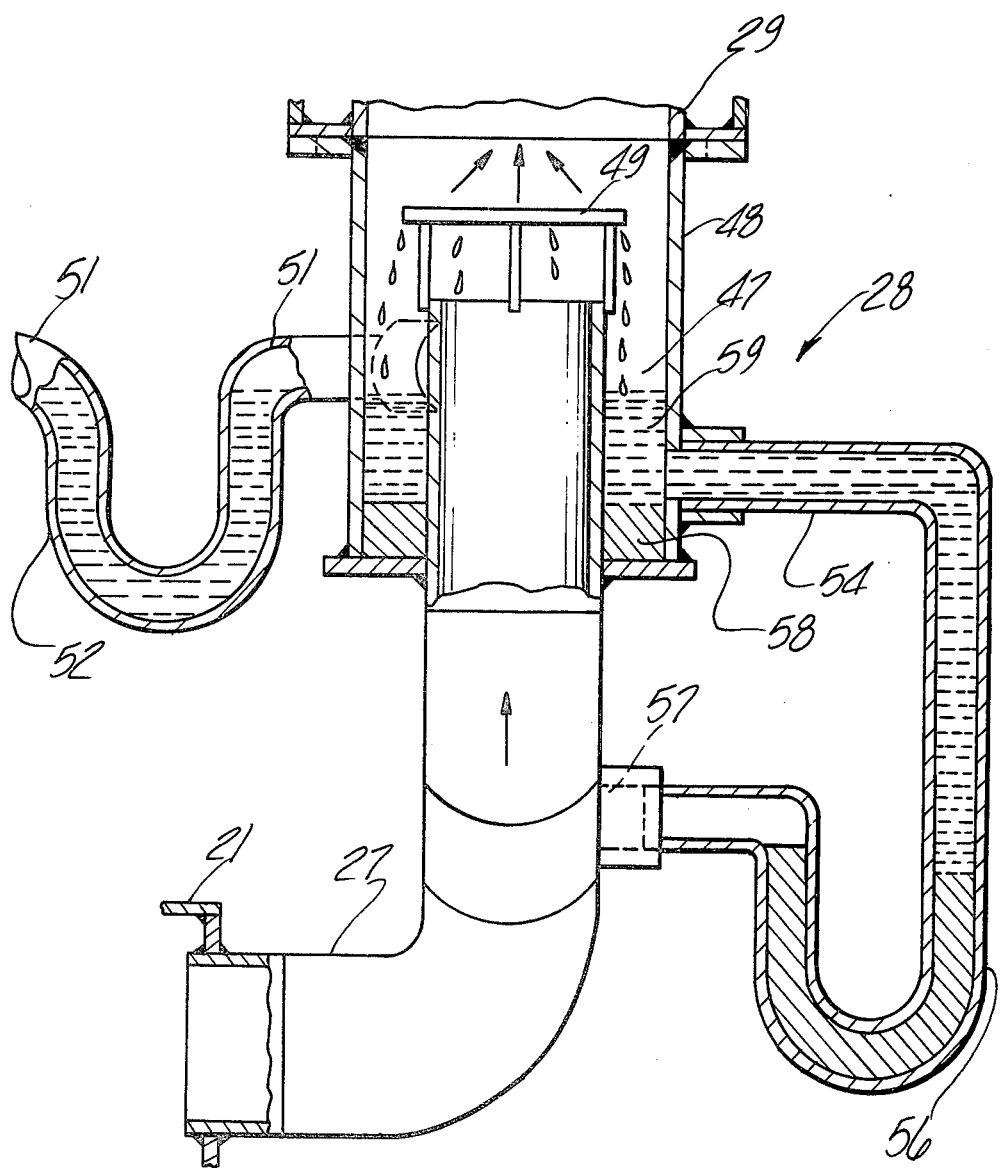

It will be appreciated that separators 28 and 44 and their associated condensers 29 and 46 are similar in construction and operation, and therefore the discussion with respect to separator 28 and condenser 29 is appropriate to all such units in the overall apparatus. Referring now more particularly to FIG. 2, there is shown separator 28 in greater detail, which separator is interposed between line 27 and condenser 29 as shown.

The separator comprises an annular chamber 47 formed by the housing of a vertical section of outlet pipe 27 and a lower extension 48 of the condenser or heat exchanger 29. A baffle plate 49 is situated above the outlet of line 27 to prevent water from returning back through the hydrogen-outlet pipe. The separator 28 also comprises an upper line 51 adapted to drain water from the chamber 47, with the line 51 containing a trap 52 and communicating back to the water feed line 22 as shown in FIG. 1. The separator 28 also comprises a lower line 54 which contains a trap 56 and then feeds back to line 27 at exit 57. It will be appreciated that as the liquids condense in the separator 29, they will collect in chamber 47 with mercury collecting at the bottom as indicated by the numeral 58, and water will collect above the mercury in the chamber 47 as indicated by the numeral 59.

In operation, the trap 56 is filled with mercury so that no vapors can pass in that direction. The upper level of lower line 54 will be filled with water along with the water in chamber 59 up to the level of the outlet of pipe line 54. Thus, it is seen that when the level of mercury exceeds the outlet level of line 54, mercury flows out from the chamber 47 and back through the trap 56 and through line 27 to the decomposer. It is also seen that when water reaches above the level of outlet 51, it passes through trap 52 and from line 51 back to water feed line 22 and into the decomposer.

Thus, it is seen that substantial quantities of mercury, which leave the decomposer through the hydrogen line 27, are returned back to the unit whence the mercury came, and this has the advantage of retaining the mercury balance in an improved fashion. Of course, small amounts of mercury vapor will pass through the condenser or heat exchanger and be lost. Therefore, make-up mercury will be required, but the amount of mercury needed to be returned to the unit is reduced to a factor of less than 1/100 and generally less than 1/200 of that which would otherwise be required. In addition, the returning liquid mercury has been cooled to a temperature below the boiling point of water, and generally considerably therebelow. The cooled mercury will tend to pick up mercury vapors as it flows back into the decomposer in countercurrent relation therewith, thus improving the efficiency of the mercury separation.

In its process form, the invention provides a method for making alkali hydroxide and chlorine in a plurality of electrolytic cell units of the amalgam type wherein a decomposer is provided for each cell and wherein the hydrogen exiting from each decomposer is passed through an overhead outlet into a condenser, the condensate condensed in the condenser is collected in a liquid separator, the mercury is returned to the decomposer back through the overhead outlet, and the water condensate is recycled to the decomposer at the normal water-feed location. Thus, the process steps are automatically carried out by the apparatus disclosed. In general, the vapors leaving the decomposer are at a temperature below the boiling point of the aqueous hydroxide solution at its discharge location, and the vapors are preferably cooled in the condenser to a temperature in the range of about 40° F. to about 120° F.

It will be appreciated that the more efficient the cooling, the greater the amount of mercury that will be automatically recycled. In general, the hydrogen passing through the condenser may be disposed of or further purified for other use. In either case, it is generally advisable to reduce the mercury content of the hydrogen effluent still further by auxiliary recovery means. However, with major portions of the mercury already removed, the load on the auxiliary recovery is also reduced to a minimum. In addition, recycling from an auxiliary recovery system is not necessary.

In the example below, typical operating parameters are given for a typical manufacturing apparatus incorporating the present invention. However, it should be understood that the example is given purely for the purpose of illustration, and is not to be construed in any way as being limitative of the invention.

EXAMPLE

A typical plant containing 26 units has each unit equipped with a separator and condenser as disclosed herein. The vapors at the hydrogen outlet are at a temperature of 230° F. as they enter line 27, and they leave the condenser 29 at a temperature of 100° F. The flow of hydrogen in pounds per hour is 14.82 through both line 27 and the exit of the condenser unit. The flow of mercury vapor in pounds per hour is 2.65 through line 27 and 0.01 at the outlet of the condenser. The pounds per hour of water vapor passing through line 27 is 251.64, and the pounds per hour of water vapor passing through the outlet of the condenser is 9.48. This cooling is achieved by utilizing 34 gallons per minute of 90° F. to 105° F. cooling water with a duty of 255,500 BTU's per hour.

From the above data, it is seen that the amount of mercury vapor is reduced from 2.65 pounds per hour to 0.01 pounds per hour, so that practically all the mercury is automatically recycled and retained in the unit whence it came. In addition, 242.16 pounds per hour of pure water is recycled to the water feed system.

Thus, it is seen that the invention provides a thoroughly reliable automatic recovery system for nearly all of the mercury and provides the advantage of retaining the proper mercury distribution within individual cell units in multicell unit plants with the minimum of makeup.

The embodiments of the invention in which an exclusive property or privilege is claimed are defined as follows:

1. In a process for making alkali hydroxide and chlorine in a plurality of electrolytic cell units of the amalgam type wherein a decomposer is provided with each cell unit and wherein alkali-metal amalgam formed in the cell is reacted with water in the decomposer to form alkali hydroxide and hydrogen, the improvement comprising the steps of
    passing the hydrogen and the water and mercury vapors carried therewith through an overhead outlet into a condenser,
    collecting mercury and water condensate from the condenser in a liquid separator,
    returning the mercury to the decomposer back through the overhead outlet, and
    recycling the water condensate to the decomposer at the normal water-feed location.

2. The process of claim 1, wherein the separator is formed with the lower outlet and a lower conduit including the lower trap leading back to the decomposer whereby mercury will automatically flow from the separator through the trap and back to the decomposer while providing a barrier against water flow through the lower conduit.

3. The process of claim 2, wherein the separator is also formed with an upper outlet and an upper conduit including an upper trap, whereby water will automatically flow from the separator in through the trap, said trap providing a barrier between the hydrogen atmosphere and the downstream portion of the upper conduit.

4. The process of claim 1, wherein the vapors leaving the decomposer are at a temperature of about or slightly lower than the boiling point of the aqueous alkali hydroxide solution at its discharge location, and wherein the vapors are cooled in the condenser to a temperature in the range of about 40° to about 120° F.

5. The process of claim 1, wherein the separator is formed with an upper outlet and an upper conduit including an upper trap, whereby water will automatically flow from the separator through the trap, the trap providing a barrier between the hydrogen atmosphere and the downstream portion of the upper conduit.

6. In an apparatus for making alkali-metal hydroxides from alkali-metal amalgam including a plurality of cell units each having an electrolytic cell wherein alkali metal amalgam is made, and a decomposer wherein the alkali-metal amalgam is reacted with water to form caustic and hydrogen, in combination, a hydrogen-vapor outlet line having an upwardly extending condenser unit thereon, and a separator located on the hydrogen outlet between the decomposer and the condenser, said separator being formed for separating mercury condensate from water condensate, and returning the mercury by gravity to the decomposer through the hydrogen-vapor outlet.

7. The apparatus of claim 6, wherein the separator is formed with a lower outlet and lower conduit including a lower trap leading back to the decomposer whereby mercury will automatically flow from the separator through the trap and back to the decomposer while providing a barrier against water flow through the lower conduit.

8. The apparatus of claim 7, wherein the separator is also formed with an upper outlet and an upper conduit including an upper trap, whereby water will automatically flow from the separator and through the trap, said trap providing a barrier between the hydrogen atmosphere and the downstream portion of the upper conduit.

* * * * *